United States Patent [19]

Ito

[11] Patent Number: 5,213,552
[45] Date of Patent: May 25, 1993

[54] VEHICLE POWER TRANSMISSION

[75] Inventor: Koki Ito, Higashi-Hiroshima, Japan

[73] Assignee: Mazda Motor Corporation, Hiroshima, Japan

[21] Appl. No.: 722,162

[22] Filed: Jun. 27, 1991

[30] Foreign Application Priority Data

Jun. 28, 1990 [JP] Japan .................................. 2-170788
Mar. 22, 1991 [JP] Japan .................................. 3-57575

[51] Int. Cl.⁵ .......................................... F16H 3/66
[52] U.S. Cl. .................................. 475/276; 475/285; 475/278
[58] Field of Search ............... 475/275, 276, 277, 278, 475/279, 280, 281, 282, 285, 286, 287, 292, 311, 312, 317, 318, 323, 324

[56] References Cited

U.S. PATENT DOCUMENTS

| | | | |
|---|---|---|---|
| 4,304,153 | 12/1981 | Moroto et al. | 455/67.5 |
| 4,594,914 | 6/1986 | Kubo et al. | 475/285 X |
| 4,624,154 | 11/1986 | Kraft et al. | 475/278 X |
| 4,774,856 | 10/1988 | Hiraiwa | 475/285 |
| 4,836,050 | 6/1989 | Numazawa et al. | 475/66 |
| 4,899,621 | 2/1990 | Sakakibara | 475/205 |
| 4,916,977 | 4/1990 | Aoki et al. | 475/205 |
| 4,924,729 | 5/1990 | Sherman et al. | 475/285 X |
| 5,059,162 | 10/1991 | Otsuka | 475/276 |

FOREIGN PATENT DOCUMENTS

| | | |
|---|---|---|
| 3825733 | 2/1989 | Fed. Rep. of Germany . |
| 57-173642 | 10/1982 | Japan .................................. 475/285 |
| 59-117943 | 7/1984 | Japan .................................. 475/276 |
| 60-205049 | 10/1985 | Japan .................................. 475/276 |
| 62-56652 | 3/1987 | Japan .................................. 475/285 |
| 62-45426 | 9/1987 | Japan . |

OTHER PUBLICATIONS

Japanese Abstract; 58-50347; Driving Device for Automobile Appl. No. 56-147436; 1981.

Primary Examiner—Richard M. Lorence
Assistant Examiner—Khoi Q. Ta
Attorney, Agent, or Firm—Keck, Mahin & Cate

[57] ABSTRACT

A transmission has a pair of parallel shafts, a first shaft being connected through a torque converter with a vehicle engine and a second shaft carrying an output gear which is adapted to engage with a differential unit for the front wheel drive axle. The first shaft is provided with a first gear system thereon which includes one or more planetary gearsets, and the second shaft is provided with a second gear system thereon which includes a planetary gearset. A sun gear constituting the planetary gearset of the second gear system is integrally provided on the second shaft so that it can rotate together with the second shaft. A brake and a one-way clutch for controlling the action of this planetary gearset are provided between the second shaft and the case in such a manner that the brake can restrict the rotation of the second shaft, and that the one-way clutch can prohibit the rotation of the second shaft in one direction. The output gear is carried rotatably on the second shaft.

27 Claims, 8 Drawing Sheets

FIG. 2

| SPEED | FRICTION ELEMENT ||||||||||| REMARKS ||
| --- | --- | --- | --- | --- | --- | --- | --- | --- | --- | --- | --- | --- | --- |
| | K0 | K1 | K2 | B0 | B1 | B2 | B3 | OWC0 | OWC1 | OWC2 | FIRST GEAR SYSTEM | SECOND GEAR SYSTEM |
| 1ST | | | O | (O) | | (O) | | O | | O | 1ST | L |
| 2ND | O | | O | | | (O) | | | | O | 1ST | H |
| 3RD | | | O | (O)(O) | | | O | O | O | | 2ND | L |
| 4TH | O | O | O | (O) | | | O | O | | | 3RD | L |
| 5TH | | O | O | | | | O | | | | 3RD | H |
| REVERSE | | O | | O | | O | | O | | | | |

( ): APPLIED DURING COASTING

VEHICLE POWER TRANSMISSION

FIELD OF THE INVENTION

This invention relates generally to vehicle power transmissions and, more particularly, to vehicle power transmissions for selectively changing the gear ratio between an input and an output. More specifically, the present invention pertains to vehicle power transmissions having a pair of parallel shafts, one being adapted to provide power input means and carrying multiple stage gear means, the other being provided with gear means which is connected with the gear means on the first mentioned shaft.

DESCRIPTION OF THE PRIOR ART

In motor vehicles of a front-engine-front-drive type, the engine is located in a front engine compartment with the power output shaft arranged to extend in a transverse direction of the vehicle. A power transmission is then provided at an axial end of the engine to be connected with the output shaft of the engine. In order to locate the differential gear mechanism at a transverse center part of the vehicle, the power transmission for this type of vehicle generally includes a first shaft which is adapted to be connected with the output shaft of the engine through a power clutch or a torque converter, and a second shaft which is parallel with the first shaft to provide an output part of the transmission. Usually, the first shaft carries one or more multiple stage gear mechanisms, such as planetary gear mechanisms, for providing a plurality of gear stages of different gear ratios. The second shaft carries a gear mechanism of, for example, a planetary type for receiving power from the gear mechanism on the first shaft.

The Japanese Patent Application No. Sho 56-14743, filed on Sep. 17, 1981 and published for opposition on Sep. 26, 1987 under the publication No. Sho 62-45426, discloses a power transmission of this type. The transmission disclosed in this patent publication includes a first or input shaft mechanism connected through a torque converter with the output shaft of the engine. The first shaft carries two sets of planetary gear mechanisms which provide a plurality of gear stages. Also, a second shaft is provided in parallel with the first shaft mechanism and carries a planetary gear mechanism which is connected with the first shaft mechanism so as to be driven thereby. The second shaft is further connected through a gear mechanism with a differential gear mechanism for the front wheel drive axle.

In the transmission of the prior art, the planetary gear mechanism on the second shaft includes a sun gear mounted rotatably on the second shaft, the sun gear being in meshing engagement with planetary gears or planet pinions. There is provided a ring gear which is engaged with the gear mechanism on the first shaft, so that the planetary gear mechanism on the second shaft is drivingly connected with the first shaft. mechanism. The planetary gears are carried by a planetary carrier or planet-pinion carrier which is connected with the second shaft. It has been found, however, that the structure of the planetary gear mechanism on the second shaft is disadvantageous in that the sun gear is mounted rotatably on the second shaft. In order to make the sun gear rotatable on the second shaft, it has to be carried on the second shaft by means of a bearing device. It follows that the diametrical dimensions of the sun gear and, therefore, those of the planetary gear mechanism have to be increased.

Another drawback in the transmission of the prior art resides in that the second shaft carries friction or reaction elements, such as a brake, a clutch, and a one-way clutch adjacent to the planetary gear mechanism on the second shaft in such a manner that they can control the rotation or revolution of the sun gear and the planetary carrier due to their engagement with a transmission case or their action of connecting the sun gear with the planetary carrier. These elements are located at radially outward positions relative to the second shaft between the planetary gear mechanism and an output gear which is connected with the differential gear mechanism. This arrangement of these elements makes the structure of the second shaft mechanisms complex and causes an increase in the diametrical dimension of the transmission.

SUMMARY OF THE INVENTION

It is, therefore, an object of the present invention to provide a vehicle power transmission having a reduced diametrical dimension.

Another object of the present invention is to provide a vehicle power transmission which is suitable for a front-engine, front-drive type vehicle.

A further object of the present invention is to provide a vehicle power transmission which has a pair of parallel shafts and in which a radial dimension of the transmission can be reduced by providing a compact planetary gear mechanism on one of the shafts.

According to the present invention, the above and other objects can be accomplished by a vehicle power transmission including a transmission case means, first shaft means rotatable on the case means and adapted to receive a driving torque from a vehicle engine, multiple stage first gear means provided on the first shaft means, a second shaft means substantially parallel with the first shaft means, second gear means of planetary gear type provided on the second shaft means, friction means and reaction means for controlling operations of the second gear means, and output means provided on the second shaft means. The second gear means includes a sun gear provided on the second shaft means to rotate therewith, the friction means are provided between the second shaft means and the case means to restrict the rotation of the second shaft means, the reaction means are provided in association with the second shaft means so as to prohibit the rotation of the second shaft means in one direction, and the output means are provided rotatably on the second shaft means.

These object and features of the present invention are set forth with particularity in the appended claims. The present invention, both as to its organization and manner of operation, together with further objects and advantages, may be best understood by reference to the following description, taken in conjunction with the accompanying drawings.

BRIEF DESCRIPTION OF THE DRAWINGS

The present invention will be described in more detail in conjunction with the drawings, in which:

FIG. 2 is a table showing the conditions that are possible in the automatic transmission of FIG. 1;

DESCRIPTION OF THE PREFERRED EMBODIMENTS

Figure 1:
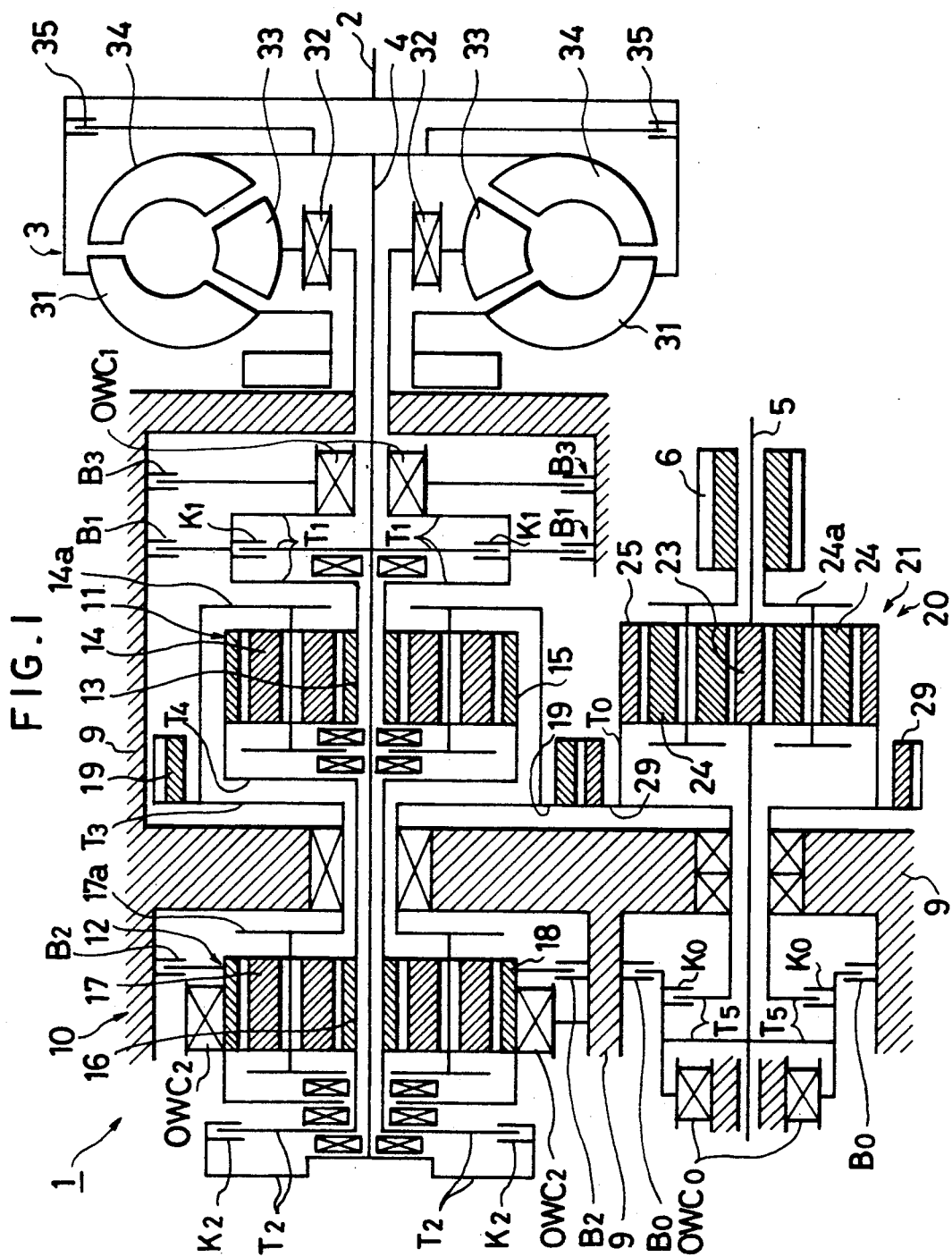
FIG. 1 is a cross-sectional diagrammatic illustration of an embodiment of an automatic transmission according to the present invention.
Figure 3A:
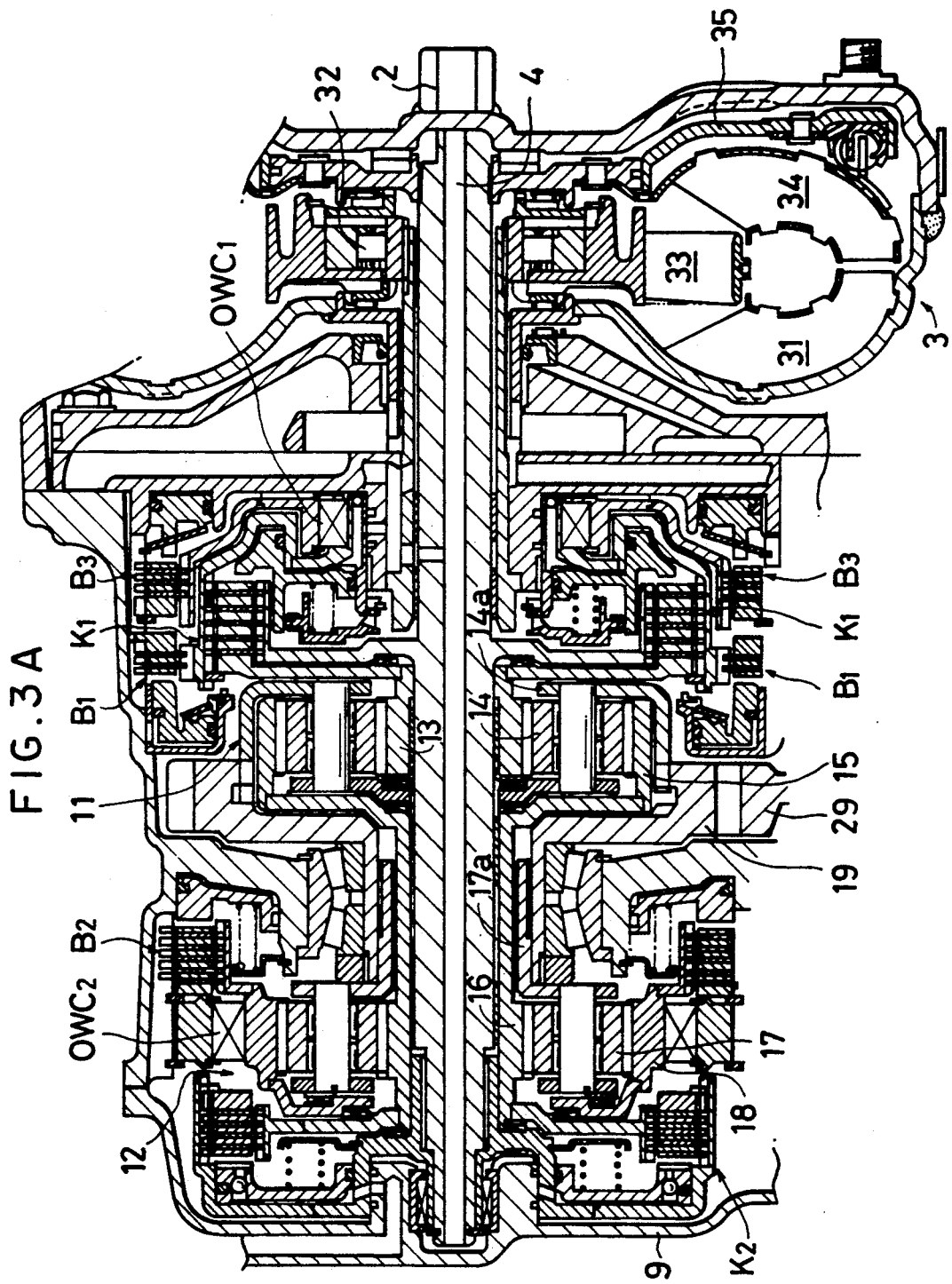
FIGS. 3A and 3B are detailed cross-sectional views showing the construction of transmission sections 10 and 20, respectively, of the automatic transmission of FIG. 1.
Figure 3B:
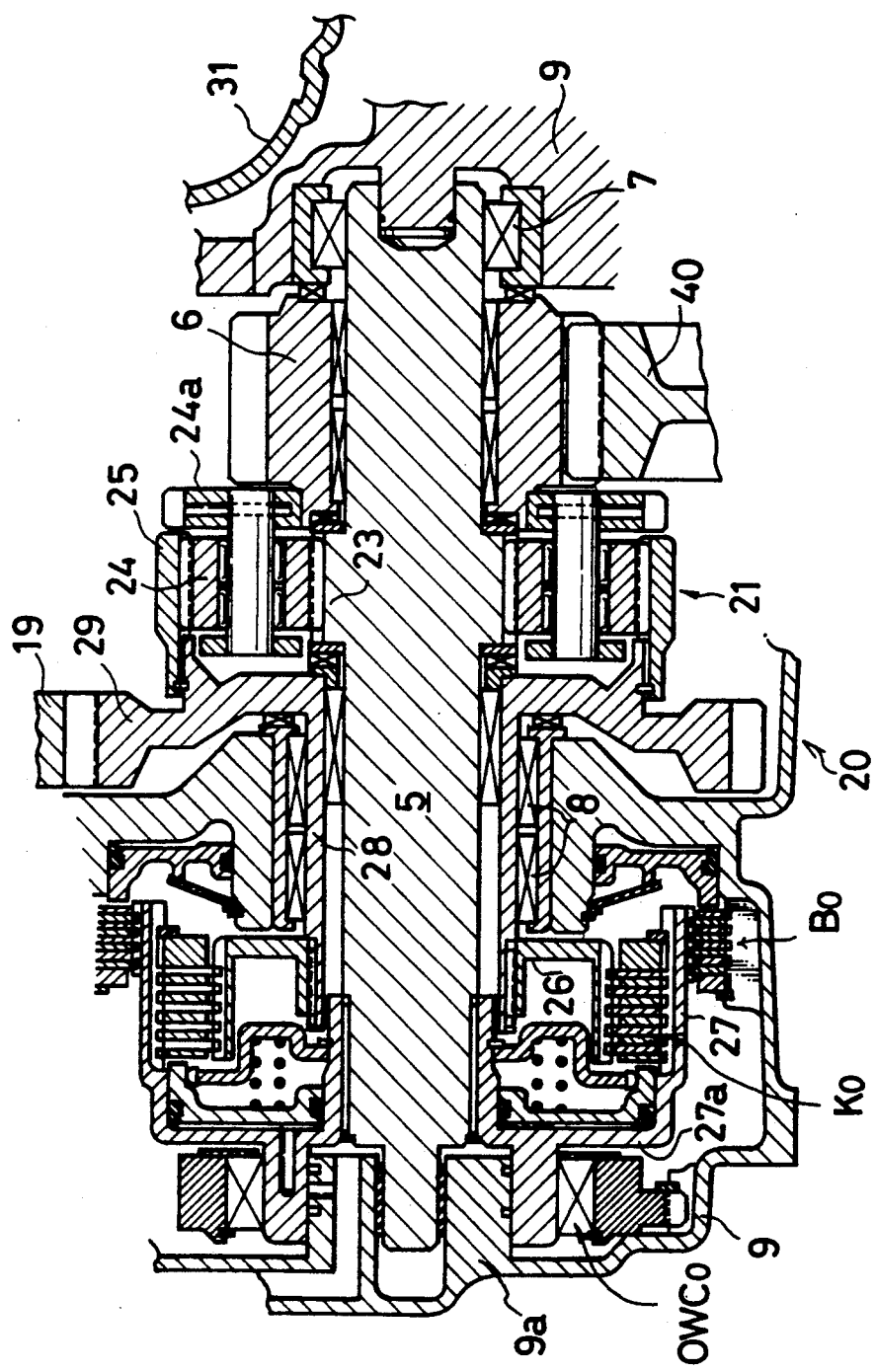

Referring now to the drawings, wherein like components are designated by like reference numerals throughout the various figures, attention is first directed to FIGS. 1 through 3. FIG. 1 illustrates the first embodiment of a multiple-speed automatic transmission of a planetary-gear type in accordance with the present invention, FIG. 2 illustrates available speed of the transmission shown in FIG. 1 and the conditions of the friction elements in the respective speed, and FIGS. 3A and 3B show the construction of the transmission.

The automatic transmission 1 is a five-speed power transmission of a planetary gear type, which is mounted on a front-engine and front-wheel drive (FF) vehicle. The transmission 1 has a input shaft 2 to be connected or integral with an engine crankshaft (not shown), and a torque converter 3 constituting a fluid coupling. The torque converter 3 transmits the engine power or driving torque inputted into the input shaft 2, to the following gear train through its fluid.

The transmission 1 also has a first rotatable shaft 4 to which output torque from the torque converter 3 is transmitted, and a second rotatable shaft 5 which is arranged parallel with the first shaft 4. The first shaft 4 carries a first gear system 10 which is arranged concentrically with the first shaft 4, and the second shaft 5 carries a second gear system 20, which is arranged concentrically with the second shaft 5 and to which torque converted by the first gear system 10 is transferred. The second gear system 20 includes a transmission output gear 6. The output gear 6 is adapted to transmit torque which has been converted by the second gear system 20, to an input gear of a differential unit (not shown) for front wheel drive axles.

The torque converter 3 is of a conventional type, which includes a pump impeller 31 connected to the input shaft 2, a stator 33 connected to a transmission case 9 by means of a one-way clutch 32, a turbine 34 integrally connected to the first shaft 4, and a so-called damper piston 35 which constitutes a lockup mechanism.

The first and second shaft 4, 5 are journalled in suitable bearings disposed on the transmission case 9, and are axially spaced apart from and parallel with each other to extend in the axial direction of the transmission 1.

The first gear system 10 on the first shaft 4 includes two separate planetary gearsets 11, 12, which convert the engine torque transmitted through the torque converter 3 in accordance with their predetermined gear ratios. Also, the first gear system 10 has a plurality of friction or reaction elements for controlling action of the planetary gearsets 11, 12 to provide a desired speed of torque. The friction elements include clutches $K_1$, $K_2$ for selective shifting of a torque transmitting path or a power flow, and brake or braking devices $B_1$, $B_2$, $B_3$ for restricting the rotation or revolution of the planetary gearsets 11, 12. The reaction elements include one-way clutches $OWC_1$, $OWC_2$ for prohibiting or limiting the rotation or revolution of the planetary gearsets 11, 12 in one direction. Further, the first gear system 10 has an output gear 19 for transmitting the torque converted by the first gear system 10 to the second gear system 20.

The planetary gearset 11 is constructed of a sun gear 13 rotatably mounted on the first shaft 4, planetary gears or planet pinions 14 meshing with the sun gear 13, an internal gear or ring gear 15 meshing with the planet pinions 14, and a planet-pinion carrier 14a rotatably carrying the planet pinions 14. Similarly, the second gearset 12 is constructed of a sun gear 16 rotatably mounted on the first shaft 4, planet pinions 17 meshing with the sun gear 16, a ring gear 18 meshing with the planet pinions 17, and a planet-pinion carrier 17a rotatably carrying the planet pinions 17. The ring gear 15 is integrally connected with the sun gear 16 through a torque transmitting path $T_4$ and the carrier 14a is integrally connected with the carrier 17a through a torque transmitting path $T_3$.

The clutch $K_1$ is interposed in a torque transmitting path $T_1$ extending between the first shaft 4 and the sun gear 13 of the planetary gearset 11, so that the clutch $K_1$ is able to selectively connect or disconnect the first shaft 4 and the sun gear 13 upon changing the gear ratio of the first gear system 10. The clutch $K_2$ is interposed in a torque transmitting path $T_2$ extending between the first shaft 4 and the sun gear 16 of the planetary gearset 12, so that the clutch $K_2$ is able to selectively connect or disconnect the first shaft 4 and the sun gear 16 upon changing the gear ratio of the first gear system 10.

The one-way clutch $OWC_1$ and the braking device $B_3$ are disposed in series and interposed between the torque transmitting path $T_1$ and the transmission case 9, so that they are able to control the rotation of the sun gear 13. The one-way clutch $OWC_2$ and the braking device $B_2$ are disposed adjacent to the ring gear 18 in parallel and interposed between the ring gear 18 and the case 9, so that they are able to control the rotation of the ring gear 18. Further, the braking device $B_1$ is interposed between the torque transmitting path $T_1$ and the case 9, so that it is able to restrict the rotation of the sun gear 13, thereby allowing the transmission 1 to effect an action of engine brake while coasting. The output gear 19 is disposed between the planetary gearsets 11, 12 and integrally connected to the carriers 14a and 17a in the path $T_3$. The output gear 19 is in meshing engagement with a counter gear 29 of the second gear system 20. The second gear system 20 is constituted as a gear train of reduction type, and it is able to be selectively set to two different preset gear ratios, that is, one gear ratio of 1.0 and the other gear ratio less than 1.0. The second gear system 20 is located on the second shaft 5, and has a planetary gearset 21 carried on the second shaft 5. The second gear system 20 includes a plurality of friction or reaction elements for controlling action of the planetary gearset 21 to provide a desired ratio of torque. The friction elements include a clutch $K_0$ for selective shifting of a torque transmitting path or a power flow, and a braking device $B_0$ for restricting the rotation or revolution of the planetary gearsets 21. The reaction element is a one-way clutch $OWC_0$ for prohibiting or limiting the rotation or revolution of the planetary gearsets 21 in one direction, and the one-way clutch $OWC_0$ is interposed between the torque transmitting pass $T_5$ and the transmission case 9.

The planetary gearset 21 is constructed of a sun gear 23 integrally formed on the second shaft 5, planet pinions 24 meshing with the sun gear 23, a ring gear 25 meshing with the planet pinions 24, and a planet-pinion carrier 24a rotatably carrying the planet pinions 24. The ring gear 25 is integrally connected with the counter gear 29 through a torque transmitting path $T_0$, and the carrier 24a is integrally connected with the output gear 6 which is carried rotatably on the second shaft 5.

The clutch $K_0$ is interposed in a torque transmitting path $T_5$, extending between the ring gear 25 and the second shaft 5, so that the clutch $K_0$ is able to selectively lock the ring gear 25 and the second shaft 5 together, thereby allowing the entire planetary gearset 21 to act as a solid shaft.

The one-way clutch $OWC_0$ and the braking device $B_0$ are interposed between an end portion of the shaft 5 and the transmission case 9 so as to control the rotation of the shaft 5. Because of the integrity of the shaft 5 and the sun gear 23, the one way clutch $OWC_0$ and the braking device $B_0$ can provide braking force and reaction force to the sun gear 23 through the shaft 5, that is, they can act as means for controlling movement of the planetary gearset 21 as desired.

Referring to FIG. 2, there is shown an example of operation of the friction and reaction elements in the transmission 1. In FIG. 2, the circle marks represent the engagement of the clutches $K_0$, $K_1$, $K_3$, the application of the braking devices $B_0$, $B_1$, $B_2$, $B_3$, and the activation or locking of the one-way clutches $OCW_0$, $OCW_1$, $OCW_2$, respectively. The circle mark with parentheses represents the application of the braking devices $B_0$, $B_1$, $B_2$ that is available to provide the engine brake action of the transmission 1, if desired.

According to FIG. 2, for example, in the 1st speed, the clutch $K_2$ is engaged, the one-way clutches $OWC_0$, $OWC_2$ are activated to enable a rotation of the associated component only in the predetermined direction and prohibit the rotation thereof in the opposite direction. The other elements, i.e., all the braking devices $B_0$, $B_1$, $B_2$, $B_3$, the clutches $K_0$, $K_1$ and the one-way clutch $OWC_1$, are held in disengaged or deactivated states. In the 2nd speed, the clutches $K_0$, $K_2$ are engaged, the one-way clutch $OWC_2$ is activated to enable the rotation only in the predetermined direction, and the other elements, i.e., all the braking device $B_0$, $B_1$, $B_2$, $B_3$, the clutch $K_1$ and the one-way clutches $OWC_0$, $OWC_1$, are held in disengaged or deactivated states.

It is apparent that, similarly to the 1st or 2nd speed, the friction and reaction elements are engaged/disengaged or activated/deactivated in accordance with the table of FIG. 2 in the 3rd, 4th, 5th speed and reverse.

In the remarks column, there are shown the conditions of each of the first and second gear systems 10, 20 in association with the conditions of the whole transmission 1. From a consideration of the relationship between the condition of the transmission 1 and those of the respective gear systems 10, 20, it is obvious that the five-forward speeds of the transmission 1 are established from combinations of 1st, 2nd and 3rd speeds of the first gear system 10 and low (L) and high (H) speeds of the second gear system 20. In other words, the entire gear ratio of the transmission 1 is established from a combination of three stages of the first gear system 10 and two stages of the second gear system 20. As the entire gear ratio obtained from the 2nd speed and the high speed (H) of the first and second gear systems 10, 20 is close to the entire gear ratio from a combination of the 3rd speed and the low speed (L) thereof, the latter gear ratio (3rd; L) is employed as the gear ratio of the 4th speed of the transmission 1 in this embodiment.

Referring to FIG. 3, there is shown the construction of the transmission 1. From a consideration of the foregoing description, the structure and function of each component or element in FIGS. 3A and 3B will be generally apparent. The concept of the present invention is applied specifically to the construction of the second shaft 5 and the second gear system 20 and, therefore, it will be described in detail hereinafter.

As shown in FIG. 3B, the second shaft 5 is rotatably mounted on the transmission case 9 by means of radial bearings 7, 8, the bearing 7 being located in close proximity to the pump impeller 31 and the bearing 8 being located around a central portion of the shaft 5. In association with the second shaft 5, there are provided the one-way clutch $OWC_0$, the clutch $K_0$, the braking device $B_0$, the counter gear 29, the planetary gearset 21 and the output gear 6 in order from the left side of FIG. 3B, and they are arranged concentrically with the shaft 5. It should be noted that the sun gear 23 of the planetary gearset 21 is integrally formed on the shaft 5 around the central portion thereof.

The counter gear 29 is located around the central portion of the shaft 5 and on the left side of the planetary gearset 21 as seen in FIG. 3B. Gear teeth formed on a periphery of the counter gear 29 are in mesh with those of the output gear 19 of the first gear system 10. An extension 28 of the counter gear 29 is supported by the bearing 8 mounted on the transmission case 9, and rotatably carried on the shaft 5 by means of a radial bearing. The extension 28 extends from a radially inward portion of the counter gear 29 along the outer surface of the second shaft 5 and defines the torque transmitting path $T_5$ as shown in FIG. 1. The extension 28 is splined to a clutch hub 26 of the clutch $K_0$, which extends radially outward from an end portion of the extension 28. The clutch $K_0$ is constructed as a hydraulic-actuated clutch assembly. The clutch $K_0$ is provided with a plurality of friction clutch discs carried by the clutch hub 26, a cylindrical clutch drum 27 formed concentrically with the clutch hub 26 and positioned radially outward thereof, a plurality of friction clutch discs arranged in an alternate fashion with the above clutch discs and carried by the clutch drum 27, and a hydraulic-actuated piston which imposes a clamping force on these discs to engage the clutch $K_0$. The clutch drum 27 also forms a portion of the braking device $B_0$ constructed as a hydraulic-actuated brake. The braking device $B_0$ includes a plurality of friction brake discs arranged in an alternate fashion and carried by the clutch drum 27 and the transmission case 9, and also includes a hydraulically actuated brake piston, which imposes a clamping force on these discs to apply the braking device $B_0$.

An end portion 27a of the clutch drum 27 extends radially inwardly, and is splined onto the outer surface of the second shaft 5. The end portion 27a further extends axially toward an end portion of the transmission case 9. An inner surface of this extension is in sliding contact with a journal bearing 9a formed on the end portion of the case 9, while an outer surface of the extension is operatively connected with the case 9 by means of the one-way clutch $OWC_0$.

On a side of the counter gear 29 opposite to the clutch $K_0$, the one-way clutch $OWC_0$ and the braking device $B_0$, the gear 29 is integrally coupled with the ring gear 25. The ring gear 25 defines the planetary gearset 21 together with the planet pinions 24, the sun gear 23 and the planet-pinion carrier 24a. The output gear 6 is disposed adjacent to the right side of the planetary gearset 21 in concentric fashion with the second shaft 5, and is integrally connected to the carrier 24a. The output gear 6 is rotatably carried on the second shaft 5 and meshes with a input gear 40 of the differential unit by means of outer gear teeth on the output gear 6.

As can be seen from the foregoing description, the transmission 1 has the output gear carried rotatably on the second shaft 5 which extends through the planetary gearset 21 toward end portions of the transmission case 9, and the sun gear 23 integrally formed on the central portion of the second shaft 5. Further, the braking device $B_0$ and the one-way clutch $OCW_0$ are interposed between the end portion of the shaft 5 and case 9 so as to provide friction and reaction force for controlling the rotation of the sun gear 23. Thus, according to this embodiment, it is possible to reduce the diametrical dimension of the sun gear 23 because of the unnecessariness of any bearing means between the sun gear 23 and the shaft 5. Further, it is not required to interpose the reaction and friction elements, such as a braking device and a one-way clutch, between the gears of the planetary gear system 21 and the case 9. This implies that construction of the second gear system 20 and thus the transmission 1 can be designed on a radially compact scale. From another aspect, the transmission 1 is suitable for a front-engine, front-drive vehicle. This is brought about because the the transmission 1 having two parallel shafts 4, 5 can transmit the output torque to the differential unit at the substantially transverse central area of an engine compartment so that the each front axle may have substantially an equal length. Also, the diametrical dimension of the transmission 1 can be reduced.

Further, the transmission 1 of this embodiment has the bearing 8 for supporting the shaft 5 located in the central area of the second gear system 20, so that a span of the shaft 5 is reduced. According to this arrangement, vibration of the shaft 5 during operation can be damped; otherwise, the diameter of the shaft 5 can be reduced.

Figure 4:
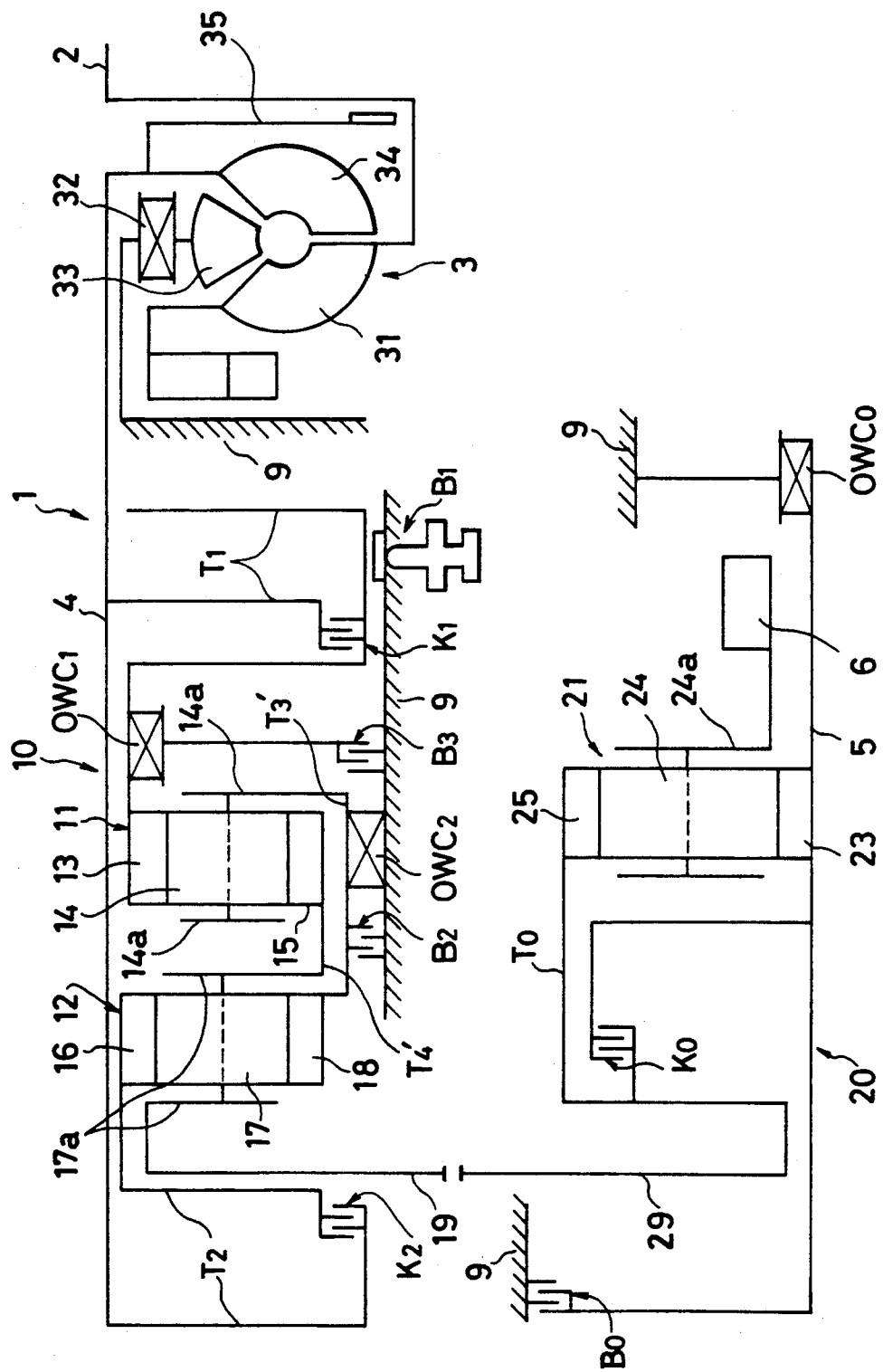
FIG. 4 is a cross-sectional diagrammatic illustration of another embodiment of an automatic transmission according to the present invention.
Figure 5:
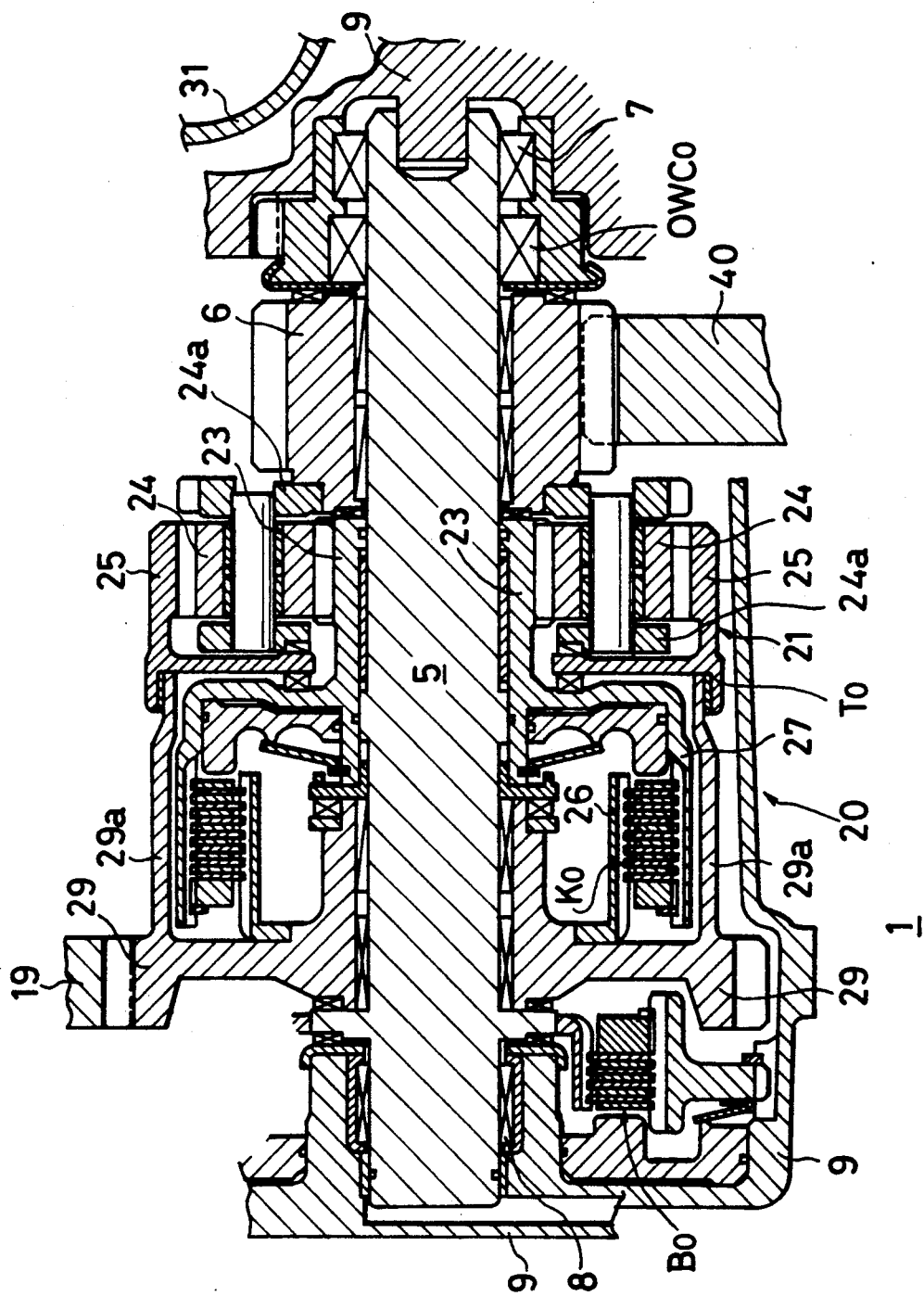
FIG. 5 is a detailed cross-sectional view partially showing the construction of the automatic transmission of FIG. 4.

Turning now to FIGS. 4 and 5 there are shown an automatic transmission of a second embodiment in accordance with the present invention, which essentially is a modified version of the above described transmission 1. The components or elements of this embodiment which correspond to those of the first embodiment are indicated by the same reference numerals. Further, an upper half of the first gear system 10 and the lower half of the second gear system 20 are omitted from FIG. 4, and in FIG. 5, only the second gear system 20 is illustrated.

Referring to FIG. 4, attention is directed to the arrangement of first and second gear systems 10, 20. This transmission 1 of FIG. 4 differs from the transmission shown in FIG. 1 in that a braking device $B_2$ and a one-way clutch $OWC_2$ of a first gear system 10 are disposed in parallel relative to a torque transmitting path $T_3'$, which extends between a planet-pinion carrier 14a of a planetary gearset 11 and a ring gear 18 of a planetary gearset 12. The braking device $B_2$ and the one-way clutch $OWC_2$ can control the rotation of the carrier 14a and the ring gear 18. An output gear 19 of the first gear system 10 is connected to a planet-pinion carrier 17a of the planetary gearset 12 and located between the planetary gearset 12 and a clutch $K_2$. The carrier 17a is integrally connected to a sun gear 15 of the planetary gearset 11 through a torque transmitting path $T_4'$. Further, the transmission 1 of this embodiment differs from the transmission of the first embodiment in that a clutch $K_0$ of the second gear system 20 is interposed between a torque transmitting path $T_0$ and a second shaft 5 to selectively lock two gears of the planetary gearset 21, i.e., a sun gear 23 integrally mounted on the shaft 5 and a ring gear 25, and that a braking device $B_0$ is interposed between one end portion of the shaft 5 remote from a torque converter 3 and a transmission case 9, while a one-way clutch $OWC_0$ located on an opposite end of the shaft 5 adjacent to the torque converter 3 and interposed between this end portion of the shaft 5 and the case 9. The functions of these friction and reaction elements are substantially the same as those in the first embodiment and, therefore, the clutch $K_0$ allows the planetary gearset 21 to act as a solid shaft, and the braking device $B_0$ and the one-way clutch $OWC_0$ provide friction and reaction forces to the sun gear 23 on the shaft 5.

This transmission 1 is operated in the same manner as the first embodiment, i.e., in accordance with the conditions of FIG. 2 and, therefore, the operations of the clutches $K_0$ through $K_2$, the braking devices $B_0$ through $B_4$ and the one-way clutches $OWC_1$, $OWC_2$, $OWC_3$ are not separately described herein.

Referring to FIG. 5, attention is directed to the arrangement of the second gear system 20. The second shaft 5 is journalled in the transmission case 9 by means of bearings 7, 8 located at opposite ends of the shaft 5. On the shaft 5, there are concentrically arranged the braking device $B_0$, a counter gear 29, the clutch $K_0$, the planetary gearset 21, an output gear 6 and the one-way clutch $OWC_0$ in order from the left side of FIG. 5 toward a torque converter 3 (FIG. 4).

The counter gear 29 is rotatably carried on the shaft 5 by means of suitable bearings and its outer gear teeth are in mesh with an output gear 19 of the first gear system 10.

The braking device $B_0$ is a hydraulic-activated brake having brake discs, and a hub carrying them. The hub is integrally carried on the shaft 5. A brake drum carrying the discs and located outward of the hub is splined to the case 9.

The clutch $K_0$ is disposed between the counter gear 29 and the planetary gearset 21 and is constituted as a hydraulic-actuated clutch. The clutch $K_0$ includes a clutch hub 26 carried by the counter gear 29, clutch discs supported by the clutch hub 26, a clutch drum 27 positioned radially outward of and concentrically with the clutch hub 26, and a hydraulically actuated piston.

The clutch drum 27 extends radially inward and then axially along the outer surface of the shaft 5. This axial extension is integrally mounted on the shaft 5 and integrally formed with the sun gear 23 of the planetary gearset 21 on its outer periphery. The planet pinions 24 mesh with the sun gear 23 and are carried by the planet-pinion carrier 24a. The carrier 24a is connected with the output gear 6, which is rotatably carried on the shaft 5 by means of bearings. The gear 6 is in mesh with an input gear 40 of a differential unit. The ring gear 25, which meshes with the planet pinions 24, can be rotated relative to the shaft 5 and connected with an axial extension 29a of the counter gear 29. The extension 29a defines the torque transmitting path $T_0$ (FIG. 4).

On the side of the output gear 6 opposite to the planetary gearset 21, the one-way clutch $OWC_0$ is located in proximity to a pump impeller 31 of the torque converter 3, and the outer race of the one-way clutch $OWC_0$ is connected with the transmission case 9. In the area in which the one-way clutch $OWC_0$ is positioned, the pump impeller 31 is curved apart from the second gear system 20.

The transmission 1 thus arranged has the sun gear 23 which is integrally mounted on the second shaft 5 extending through the planetary gearset 21 to end portions of the transmission case 3. Further, the braking device $B_0$ and the one-way clutch $OWC_0$ are interposed between each end portion of the shaft 5 and the case 9 so as to provide friction and reaction forces that control the rotation of the sun gear 23. Therefore, according to this arrangement, it is possible to reduce the diameter of the sun gear 23, and further, there is no necessity for positioning a braking device or a one-way clutch between the planetary gearset 21 and the case 9. It follows that the second gear system 20 can be constructed on a radially compact scale.

In addition, since the one-way clutch $OWC_0$ is located in the area where the pump impeller 31 of the torque converter 3 is curved in a direction away from the second gear system 20, the transmission 1 can avoid making a dead or useless space. Thus, efficient use of the space to be occupied by the transmission 1 can be achieved.

Figure 6:
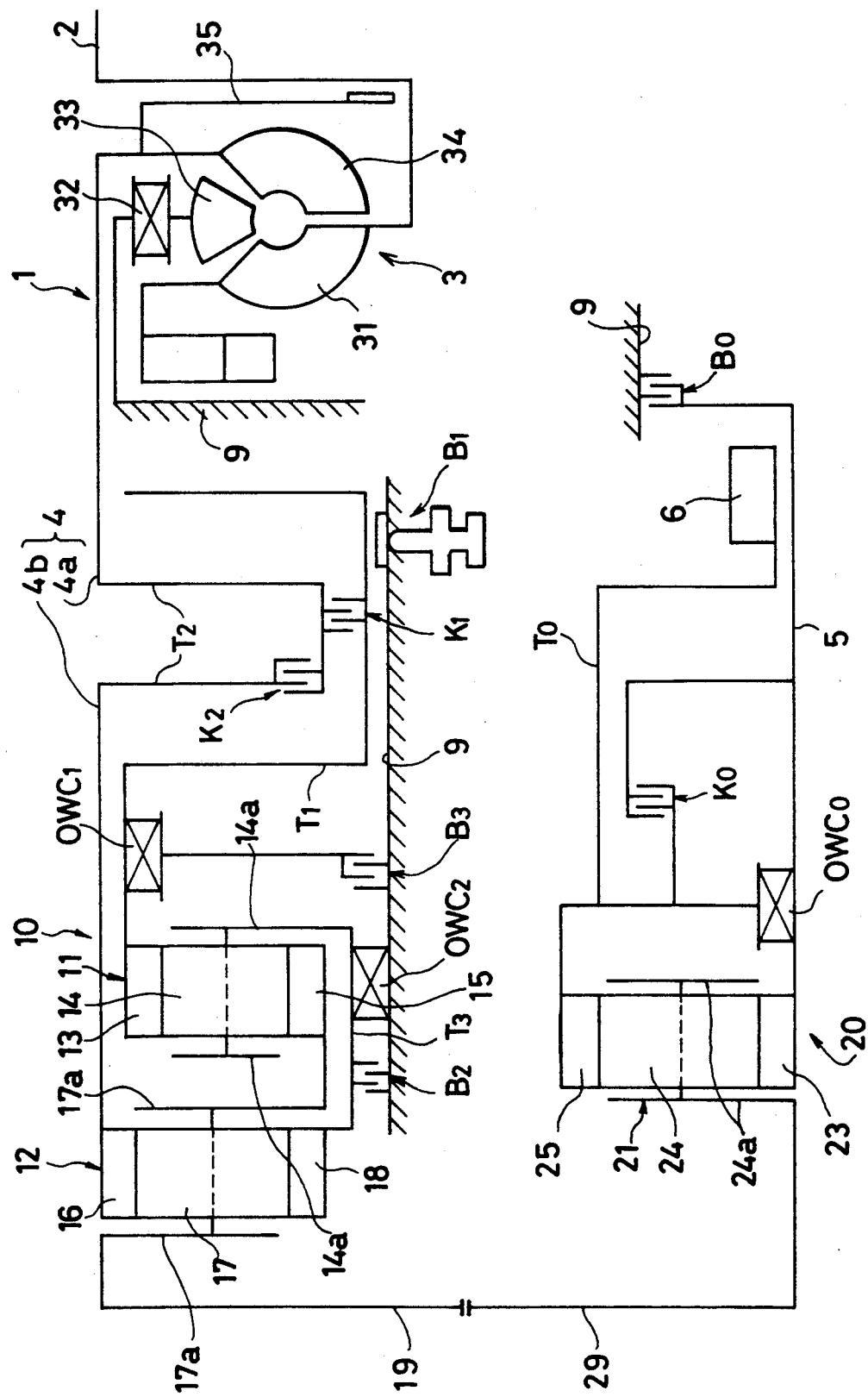
FIGS. 6 and 7 are cross-sectional diagrammatic illustrations of the other embodiments of automatic transmissions according to the present invention.

Turning now to FIG. 6, an automatic transmission of a third embodiment in accordance with the present invention is illustrated. This embodiment is a modification of the second embodiment as described above. The components or elements in this embodiment corresponding to those in the second embodiment are indicated by the same reference numerals.

The transmission 1 of this embodiment differs from that of the second embodiment in that a first shaft 4 carrying a first gear system 10 is divided into two parts 4a, 4b and that a clutch $K_2$ is interposed between the two parts 4a, 4b so that it can connect or disconnect a torque transmitting part $T_2$ extending between a turbine 34 of a torque converter 3 and a sun gear 16 of a planetary gearset 12.

Further, this transmission 1 differs from the preceding embodiment in that a counter gear 29 of a second gear system 20 is connected to a planet-pinion carrier 24a of a planetary gearset 21 at an end portion of the second gear system 20, and a clutch $K_0$ is connected to a torque transmitting path $T_0$ extending between a ring gear 25 and an output gear 6. The clutch $K_0$ is interposed between the path $T_0$ and a second shaft 5 so as to connect and disconnect the ring gear 25 and a sun gear 23 of the planetary gearset 21. Still further, in this embodiment, a one-way clutch $OWC_0$ is interposed between the path $T_0$ and the shaft 5 and is located between the planetary gearset 21 and the output gear 6, while a braking device $B_0$ located at an end portion of the shaft 5 close to the torque converter 3.

Most of the friction and reaction elements of the transmission 1, that is, the clutches $K_1$, $K_2$, the braking devices $B_1$, $B_2$, $B_3$ and the one-way clutches $OWC_0$, $OWC_1$, $OWC_2$ may be operated to be engaged and disengaged, or activated or deactivated in the same manner as the operating conditions of FIG. 2 and, therefore, they can function in substantially the same manner as the first and second embodiments. However, in this arrangement of the third embodiment, a high gear ratio (H) of the second gear system 20 is set to be a gear ratio of "overdrive", and thus, the operating conditions of the clutch $K_0$ and the braking device $B_0$ is set to be in a relation opposite to those in FIG. 2.

Figure 7:
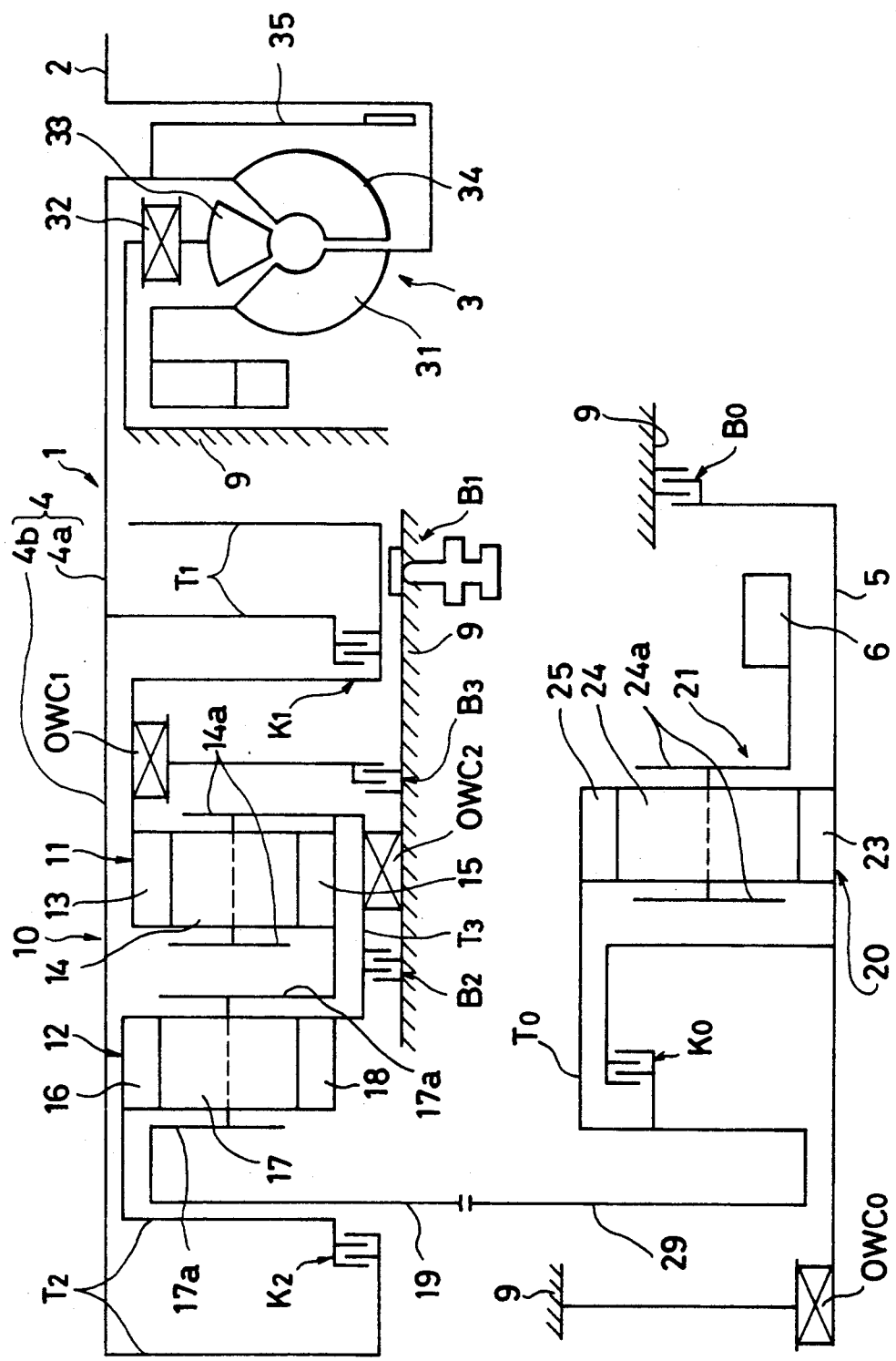

Turning now to FIG. 7, there is shown an automatic transmission of the fourth embodiment in accordance with the present invention. This embodiment is also a modification of the second embodiment as shown in FIG. 4, and the components or elements are indicated by the same reference numerals as the second embodiment.

In this transmission 1, first and second gear systems 10, 20 have substantially the same construction as the second embodiment, except for a location of a braking device $B_0$ and a one-way clutch $OWC_0$. That is, the braking device $B_0$ of the second gear system 20 is located at one end portion of a second shaft 5 in the proximity of a torque converter 3, and the one-way clutch $OWC_0$ is located at the other end portion of the second shaft 5 remote from the torque converter 3.

All of the friction and reaction elements of the transmission 1 may be operated to be engaged and disengaged, or activated and deactivated in the same manner as the operating conditions shown in FIG. 2, and, therefore, this transmission 1 can function in the same fashion as the first and the second embodiments.

In these third and fourth embodiments, the transmission 1 has the sun gear 23 integrally mounted on the second shaft 5 and the friction and reaction force that controls the rotation of the sun gear 23 is provided by the braking device $B_0$ and the one-way clutch $OWC_0$ interposed between each end portion of the shaft 5 and a transmission case 9. Thus, it is possible to reduce the diameter of the sun gear 23. Further, for providing the friction and reaction force for the planetary gearset 21, it is not necessary to locate a braking device and a one-way clutch between the planetary gearset 21 and the transmission case 9. Therefore, the second gear system 20 can be radially compact in its scale. Further, in the transmission 1 of the third or fourth embodiments, the braking device $B_0$ is located in the area where the pump impeller 31 of the torque converter 3 is curved in a direction away from the second gear system 20. Thus, a dead or useless space is prevented from being created in this area, and the space to be occupied by the transmission 1 can be efficiently used.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

For instance, in the preceding embodiments, the 4th-forward-speed is provided by a combination of the 3rd-speed gear ratio of the first gear system 10 and the low-speed gear ratio (L) of the second gear system 20, but it may be provided by another combination, i.e., the combination of the 4th-speed gear ratio of the gear system 10 and the high gear ratio (H) of the gear system 20.

Further, in those embodiments, the ring gear 25 and the sun gear 23 are locked together by the clutch $K_0$ in order to make all the elements of the planetary gearset 21 rotate together for providing the gear ratio of 1:1, but for this purpose, the clutch $K_0$ may be so arranged as to lock the other two gears, i.e. the carrier 24a and the sun gear 23, or the carrier 24a and the ring gear 25.

What is claimed is:

1. A vehicle power transmission comprising:
   a transmission case,
   first shaft means, rotatable in the transmission case, for receiving a driving torque from a vehicle engine,
   a multiple stage first gear system provided on said first shaft means,
   a second gear system of planetary gear type,
   a second shaft means substantially parallel with said first shaft means for mounting said second gear system,
   friction means and reaction means for controlling operations of said second gear system, and
   an output element provided on said second shaft means,
   said second gear system including a sun gear provided on said second shaft means to rotate therewith,
   said friction means being provided between said second shaft means and said transmission case to restrict the rotation of the second shaft means,
   said reaction means being provided in association with said second shaft means so as to prohibit rotation of the second shaft means in one direction,
   said output element being provided rotatably on said second shaft means,
   said output element being disposed adjacent to an end of the second shaft means located adjacent to an end of said first shaft means into which the driving torque from the vehicle engine is introduced, and
   said second gear system including an input means for receiving an output torque from said first gear means and transmitting the torque to a gear element of said second gear system and to said second shaft means through clutch means for selectively engaging and disengaging said input means and said second shaft means.

2. A vehicle power transmission according to claim 1, wherein said clutch means is disposed adjacent to an end of the second shaft means remote from said end of said first shaft means.

3. A vehicle power transmission according to claim 2, wherein one of said friction means and said reaction means is disposed adjacent to the end of the second shaft means remote from said end of said first shaft means.

4. A vehicle power transmission according to claim 3, wherein the other of said friction means and said reaction means is further disposed adjacent to the end of the second shaft means remote from said end of said first shaft means.

5. A vehicle power transmission according to claim 1, wherein said gear element of said second gear system is a ring gear thereof, and torque transmitted to the ring gear is further transmitted through a planetary carrier of said second gear system to said output element.

6. A vehicle power transmission comprising:
   a transmission case,
   first shaft means, rotatable in the transmission case, for receiving a driving torque from a vehicle engine,
   a multiple stage first gear system provided on said first shaft means,
   a second gear system of planetary gear type,
   a second shaft means substantially parallel with said first shaft means for mounting said second gear system,
   friction means and reaction means for controlling operations of said second gear system, and
   an output element provided on said second shaft means,
   said second gear system including a sun gear provided on said second shaft means to rotate therewith,
   said friction means being provided between said second shaft means and said transmission case to restrict the rotation of the second shaft means,
   said reaction means being provided in association with said second shaft means so as to prohibit rotation of the second shaft means in one direction,
   said output element being provided rotatably on said second shaft means, and
   said second gear system including an input means for receiving an output torque from said first gear system and transmitting the torque to a gear element of said second gear system and to said second shaft means through clutch means for selectively engaging and disengaging said input means and said second shaft means.

7. A vehicle power transmission according to claim 6, wherein said clutch means is disposed adjacent to an end of the second shaft means remote from an end of said first shaft means into which the driving torque from the vehicle engine is introduced.

8. A vehicle power transmission according to claim 7, wherein one of said friction means and said reaction means is disposed adjacent to the end of the second shaft means remote from said end of said first shaft means.

9. A vehicle power transmission according to claim 6, wherein said gear element of said second gear system is a ring gear thereof, and torque transmitted to the ring gear is further transmitted through a planetary carrier of said second gear system to said output element.

10. A vehicle power transmission according to claim 6, wherein said second gear system includes an input means for receiving an output torque from said first gear system and transmitting the torque to said second shaft means through clutch means for selectively engaging and disengaging said input means and said second shaft means, and said clutch means is disposed adjacent to one end of said second shaft means.

11. A vehicle power transmission according to claim 10, wherein said friction means, said reaction means and said clutch means are disposed adjacent to one end of said second shaft means which is located remote from an end of said first shaft means into which the driving torque from the vehicle engine is introduced.

12. A vehicle power transmission according to claim 10, wherein said output element is disposed adjacent to one end of the second shaft means which is located adjacent to one end of the second shaft means which is located adjacent to an end of said first shaft means into which the driving torque from the vehicle engine is introduced.

13. A vehicle power transmission according to claim 6, wherein one of said friction means and said reaction means is disposed adjacent to one end of said second shaft means which is located adjacent to an end of said first shaft means into which the driving torque from the vehicle engine is introduced.

14. A vehicle power transmission according to claim 6, wherein one of said friction means and said reaction means is disposed adjacent to one end of said second shaft means which is located adjacent to an end of said first shaft means into which the driving torque from the vehicle engine is introduced, and other of said friction means and said reaction means is disposed adjacent to an end of the second shaft means remote from said end of said first shaft means.

15. A vehicle power transmission according to claim 6, wherein said sun gear on said second shaft means is integrally formed on said second shaft means.

16. A vehicle power transmission according to claim 6, wherein said sun gear on said second shaft means is integrally mounted on said second shaft means.

17. A vehicle power transmission according to claim 6, wherein said second gear system is of reduction type so that it can be selectively set to two different preset gear ratios, one gear ratio being 1.0 and the other gear ratio being less than 1.0.

18. A vehicle power transmission according to claim 6, wherein said second gear system is of overdrive type so that it can be selectively set to two different preset gear ratios, one gear ratio being 1.0 and the other gear ratio being greater than 1.0.

19. A vehicle power transmission according to claim 6, wherein said friction means is a hydraulically actuated brake and said reaction means is a mechanical one-way clutch.

20. A vehicle power transmission comprising:
a transmission case,
first shaft means, rotatable in the transmission case, for receiving a driving torque from a vehicle engine,
a multiple stage first gear system provided on said first shaft means,
a second gear system of planetary gear type,
a second shaft means substantially parallel with said first shaft means for mounting said second gear system, said second shaft means also being rotatable in the transmission case,
friction means and reaction means for controlling operations of said second gear system, and
an output element provided on said second shaft means,
said second gear system including a sun gear provided on said second shaft means to rotate therewith,
said friction means being axially spaced from said second gear system and provided between said second shaft means and said transmission case to restrict the rotation of the second shaft means,
said reaction means being axially spaced from said second gear system and provided in association with said second shaft means so as to prohibit rotation of the second shaft means in one direction,
said output element being provided rotatably on said second shaft means and disposed adjacent to an end of the second shaft means which is located adjacent to an end of said first shaft means into which the driving torque from the vehicle engine is introduced, wherein said first gear system includes two sets of planetary gear mechanisms on said first shaft means and said second gear system is provided with one set of a planetary gear mechanism on said second shaft means.

21. A vehicle power transmission according to claim 16, wherein said first shaft means is selectively connected and disconnected with one of said sets of planetary gear mechanisms thereon by a first clutch and is selectively connected and disconnected with the other of said sets of planetary gear mechanisms thereon by a second clutch means.

22. A vehicle power transmission comprising:
a transmission case,
first shaft means, rotatable in the transmission case, for receiving a driving torque from a vehicle engine,
a multiple stage first gear system provided on said first shaft means,
a second gear system of planetary gear type,
a second shaft means substantially parallel with said first shaft means for mounting said second gear system,
friction means and reaction means for controlling operations of said second gear system, and
an output element provided on said second shaft means,
said second gear system including a sun gear provided on said second shaft means to rotate therewith,
said friction means being provided between said second shaft means and said transmission case to restrict the rotation of the second shaft means,
said reaction means being provided in association with said second shaft means so as to prohibit rotation of the second shaft means in one direction,
said output element being provided rotatably on said second shaft means,
said first gear system including two sets of planetary gear mechanisms on said first shaft means and said second gear system being provided with one set of a planetary gear mechanism on said second shaft means,
said first shaft means being selectively connected and disconnected to one of said sets of planetary gear mechanisms thereon by a first clutch and selectively connected and disconnected to the other of said sets of planetary gear mechanisms thereon by a second clutch, and
said first gear system including means for outputting torque therefrom to said second gear system, the means for outputting the torque being positioned between said planetary gear mechanisms on the first shaft means.

23. A vehicle power transmission comprising:
a transmission case,
first shaft means, rotatable in the transmission case, for receiving a driving torque from a vehicle engine,
a multiple stage first gear system provided on said first shaft means,
a second gear system of planetary gear type,
a second shaft means substantially parallel with said first shaft means for mounting said second gear system,
friction means and reaction means for controlling operations of said second gear system, and
an output element provided on said second shaft means,
said second gear system including a sun gear provided on said second shaft means to rotate therewith,
said friction means being provided between said second shaft means and said transmission case to restrict the rotation of the second shaft means, said reaction means being provided in association with said second shaft means so as to prohibit rotation of the second shaft means in one direction, said output element being provided rotatably on said second shaft means, said first gear system including two sets of planetary gear mechanisms on said first shaft means and said second gear system being provided with one set of a planetary gear mechanism on said second shaft means, said first shaft means being selectively connected and disconnected to one of said sets of planetary gear mechanisms thereon by a first clutch and selectively connected and disconnected to the other of said sets of planetary gear mechanisms thereon by a second clutch, and said first gear system including means for outputting torque therefrom to said second gear system, the means for outputting torque being positioned adjacent to an end of said first shaft means opposite to an end thereof into which the driving torque from the vehicle engine is introduced.

24. A vehicle power transmission comprising:

a transmission case, first shaft means, rotatable in the transmission case, for receiving a driving torque from a vehicle engine, a multiple stage first gear system provided on said first shaft means, a second gear system of planetary gear type, a second shaft means substantially parallel with said first shaft means for mounting said second gear system, friction means and reaction means for controlling operations of said second gear system, and an output element provided on said second shaft means, said second gear system including a sun gear provided on said second shaft means to rotate therewith, said friction means being provided between said second shaft means and said transmission case to restrict the rotation of the second shaft means, said reaction means being provided in association with said second shaft means so as to prohibit rotation of the second shaft means in one direction, said output element being provided rotatably on said second shaft means, said first gear system including two sets of planetary gear mechanisms on said first shaft means and said second gear system being provided with one set of a planetary gear mechanism on said second shaft means, and said second gear system including an input means for receiving an output torque from said first gear system and transmitting the torque to a gear element of said second gear system other than said sun gear and to said second shaft means through clutch means for selectively engaging and disengaging said input means and said second shaft means.

25. A vehicle power transmission according to claim 24, wherein said output element is disposed adjacent to an end of the second shaft means located adjacent to an end of said first shaft means into which the driving torque from the vehicle engine is introduced, and said clutch means is disposed adjacent to an end of the second shaft means remote from said end of said first shaft means.

26. A vehicle power transmission according to claim 25, wherein one of said friction means and said reaction means is disposed adjacent to an end of the second shaft means remote from said end of said first shaft means.

27. A vehicle power transmission according to claim 26, wherein another of said friction means and said reaction means is further disposed adjacent to the end of the second shaft means remote from said end of said first shaft means.

* * * * *